United States Patent [19]
Kyuma et al.

[11] Patent Number: 5,479,569
[45] Date of Patent: * Dec. 26, 1995

[54] INTELLIGENCE INFORMATION PROCESSING METHOD

[75] Inventors: Kazuo Kyuma; Shuichi Tai; Jun Ohta; Masaya Oita, all of Hyogo; Nagaaki Ohyama, Kanagawa; Masahiro Yamaguchi, Tokyo, all of Japan

[73] Assignee: Mitsubishi Denki Kabushiki Kaisha, Tokyo, Japan

[ * ] Notice: The portion of the term of this patent subsequent to Oct. 26, 2010, has been disclaimed.

[21] Appl. No.: 56,055

[22] Filed: Apr. 30, 1993

Related U.S. Application Data

[63] Continuation of Ser. No. 744,991, Aug. 14, 1991, Pat. No. 5,257,343.

[30] Foreign Application Priority Data

Sep. 26, 1990 [JP] Japan ..................... 2-259332

[51] Int. Cl.⁶ ..................................... G06F 15/18
[52] U.S. Cl. ................... 395/11; 395/22; 395/23
[58] Field of Search ................... 395/11, 22, 23

[56] References Cited

U.S. PATENT DOCUMENTS

| | | | |
|---|---|---|---|
| 4,802,103 | 1/1989 | Faggin et al. | 395/24 |
| 4,807,168 | 2/1989 | Moopenn et al. | 395/27 |
| 4,906,940 | 3/1990 | Greene et al. | 382/16 |
| 4,933,872 | 6/1990 | Vandenberg et al. | 395/22 |
| 4,937,873 | 6/1990 | Hopfield et al. | 395/24 |
| 4,941,122 | 7/1990 | Weiderman | 395/22 |
| 4,945,494 | 7/1990 | Penz et al. | 395/22 |
| 4,994,982 | 2/1991 | Duranton et al. | 395/27 |
| 5,040,215 | 8/1991 | Armano et al. | 395/22 |
| 5,048,097 | 9/1991 | Gaberski et al. | 395/22 |
| 5,067,164 | 11/1991 | Denker et al. | 395/22 |
| 5,129,040 | 7/1992 | Hanazato et al. | 395/25 |
| 5,129,041 | 7/1992 | Pernick et al. | 395/25 |
| 5,129,058 | 7/1992 | Mifune et al. | 395/25 |
| 5,142,666 | 8/1992 | Yoshizawa et al. | 395/27 |
| 5,153,923 | 10/1992 | Matsuha et al. | 395/101 |

FOREIGN PATENT DOCUMENTS 0294116  7/1988  European Pat. Off. .
3922129  11/1990  Germany .

*Primary Examiner*—Robert W. Downs
*Attorney, Agent, or Firm*—Wolf, Greenfield & Sacks

[57] ABSTRACT

An intelligence information processing system is composed of an associative memory and a serial processing-type computer. Input pattern information is associated with the associative memory, and pattern recognition based on the computer evaluates an associative output. In accordance with this evaluation, an associative and restrictive condition is repeatedly added to the energy function of a neural network constituting the associative memory, thereby converging the associative output on a stable state of the energy. The converged associative output is verified with intelligence information stored in a computer memory. The associative and restrictive condition is again repeatedly added to the energy function in accordance with the verification so as to produce an output from the system.

30 Claims, 3 Drawing Sheets

INTELLIGENCE INFORMATION PROCESSING METHOD

This application is a continuation of application Ser. No. 07/744,991 filed on Aug. 14, 1991 now U.S. Pat. No. 5,257,343.

BACKGROUND OF THE INVENTION

1. Field of the Invention

The present invention relates to an entirely new intelligence information processing system in which the operation of a neural network corresponding to human intuitive thinking and the operation of a serial processing-type computer corresponding to human logical thinking are combined together so as to permit the system to process information in a manner as close as possible to the manner in which the human brain functions.

2. Description of the Related Art

It is assumed that, instead of each neuron in the brain of a living being memorizing a specific piece of information, a vast number of neurons in a group cooperate with each other to simultaneously memorize a plurality of pieces of information in order to build a neural network model. It is also assumed that, in the course of an information process performed in the brain of a living being, an initial state input to each neuron is affected by combination patterns which are formed by stored information to voluntarily converge on a stable state (low state of the energy of a system), while a total computation of the input, a threshold process, and feedback are repeated.

It is therefore understood that when stored information is regarded as complete information, and when a given piece of incomplete information is input to each neuron, as shown in FIG. 1, a neuron voluntarily converges on stored information that is most similar to that input. After the neuron eventually reaches a stable state, the state of the neuron is output in the form of complete information. This is the principle of an associative memory based on a neural network model.

The following describes an example of an associative memory unit (associative memory) realized by a Hopfield model, one of the neural network models.

FIG. 2 is a view showing the structure of a conventional optical associative memory to which optical technology is applied. It is disclosed in Material for a Meeting for the Study of Optical/Quantum Electronics OQE87-174, published by The Institute of Electronics, Information and Communication Engineers, 1988.

In FIG. 2, numerals 11a and 11b designate light emitting element arrays; 12a and 12b photo-masks (space optical modulating elements); 13a and 13b light receiving element arrays; 14 a differential amplifier; 15 a comparator; 16 an input unit; and 17 an output unit.

The operation of the associative memory will now be explained. Light beams having fan-like shapes are irradiated by the light emitting element arrays 11a and 11b toward the photo-masks 12a and 12b, respectively. If the state of each light emitting element is expressed as $$X_K (K=1, 2 \ldots j, \ldots i, \ldots n).$$

and if $X_K$ is expressed as either a "1" or "0", depending on whether or not the respective light emitting element is lit, than the states inside the light emitting element arrays 11a and 11b can be given as follows:

$$X=(X_1, X_2, \ldots X_i, \ldots X_j, \ldots X_n).$$

where X is given by a vector, and n is the number of light emitting elements in the light emitting and receiving element arrays, corresponding to the number of neurons in this neural network.

Each of the photo-masks 12a and 12b is divided into n×n elements, and is constructed so that a light transmittance in each element can be separately altered. The light transmittance in each element is expressed by a matrix $$T=[T_{ij}].$$

The states inside the light receiving element arrays 13a and 13b can be given in the same manner as in the vector X as follows:

$$U=(U_1, U_2, \ldots U_i, \ldots U_j, \ldots U_n).$$

If the jth light emitting element irradiates light toward the jth row of the photo-mask, and the light transmitted through the ith column of the photo-mask is received by the ith light receiving element, the ith light receiving element operates in correspondence to carrying out a vector/matrix multiplication which is expressed by the following equation:

$$U_i = \sum_{j=1}^{n} T_{ij} X_j$$

It is assumed in the neural network that the strength that combines the respective neurons serves to store information. In the above structure, the combining strength may be realized by the transmittance T in each of the n×n elements, into which the photo-masks 12a and 12b are divided. In other words, the transmittance T in the photo-masks 12a and 12b stores information. In the Hopfield model described hereinafter, an information storage law is given by the following equation:

$$T_{ij} = \sum_{s=1}^{N} (2X_i^{(s)} - 1)(2X_j^{(s)} - 1)$$

where
N is the quantity of stored information:

$$T_{ij}=T_{ji}; \text{ and}$$

$$T_{ii}=0$$

Although $T_{ij}$ may assume both positive and negative values, it is difficult for $T_{ij}$ to optically assume negative values. In this embodiment, therefore, as shown in FIG. 2, two optical systems are manufactured, one corresponding to elements assuming positive values $T_{ij}$ and the other to those assuming negative values $T_{ij}$. The differential amplifier 14 operates to generate a difference between the outputs of the light receiving element arrays 13a and 13b. This difference is given as follows:

$$U_i=U_i^{(+)}-U_i^{(-)}$$

The signal output from the differential amplifier 14 is processed by the comparator 15 to perform the following threshold operation:

$$X_i=\theta(y)$$

where $\theta(y)=1(y>0)$, $0(y\leq 0)$ The output signal is then fed back to the light emitting element arrays 11a and 11b.

With this construction, for example, when three different characters of information, which respectively correspond to "A", "J" and "E", are stored in the photo-masks 12a and 12b, even if incomplete information, for instance, "A'", is input from the input unit 6 to the light emitting element arrays 11a and 11b, the output, while repeating the feedback operation, converges on a stored character of information "A" that is closest to the input character of information "A'". Eventually, the output is sent by the output unit 17 in the form of a complete output "A".

The above process can be described by using the terms previously mentioned. The energy of the system assumes the minimum values of stored characters of information "A", "J", and "E". When incomplete information is fed, the on/off condition of the light emitting element arrays 11a and 11b is changed so as to assume the minimum value of the energy near the light emitting element arrays. This change causes the entire system to voluntarily change, similarly to a human associative function.

According to the conventional associative memory thus constructed, even when inappropriate results are associated, it does not correct such results. In other words, the conventional associative memory is associated merely with patterns of stored data that are correlated most closely to the input, and therefore does not perform an operation corresponding to the flexible thinking of the human brain, thus limiting the versatility of the memory.

SUMMARY OF THE INVENTION

The present invention has been made to solve such a problem. An object of this invention is therefore to provide an intelligence information processing system in which an operation corresponding to human intuitive thinking and that to human logical thinking are combined together so as to complement each other.

Another object of the invention is to provide an intelligence information processing system in which the operation of a neural network corresponding to human intuitive thinking and that of a serial processing-type computer (hereinafter referred to simply as a serial computer) corresponding to human logical thinking are functionally combined.

The intelligence information processing system of the invention is capable of realizing an information process which is more intelligently carried out than in the conventional art and which operates in a manner as close as possible to the manner in which the human brain functions. In this information process, when pattern information is input, a pattern corresponding to intuitive thinking is associated, and then is corrected by logical thinking.

According to this invention, since the function of the associative memory based on the neural network and that of the serial computer are functionally combined, the associative memory and the serial computer compensate for respective functional defects. It is thus possible to perform an intelligence information process as flexibly as the human brain.

DESCRIPTION OF THE PREFERRED EMBODIMENTS

An embodiment of the present invention will be described below with reference to the drawings.

Figure 1:
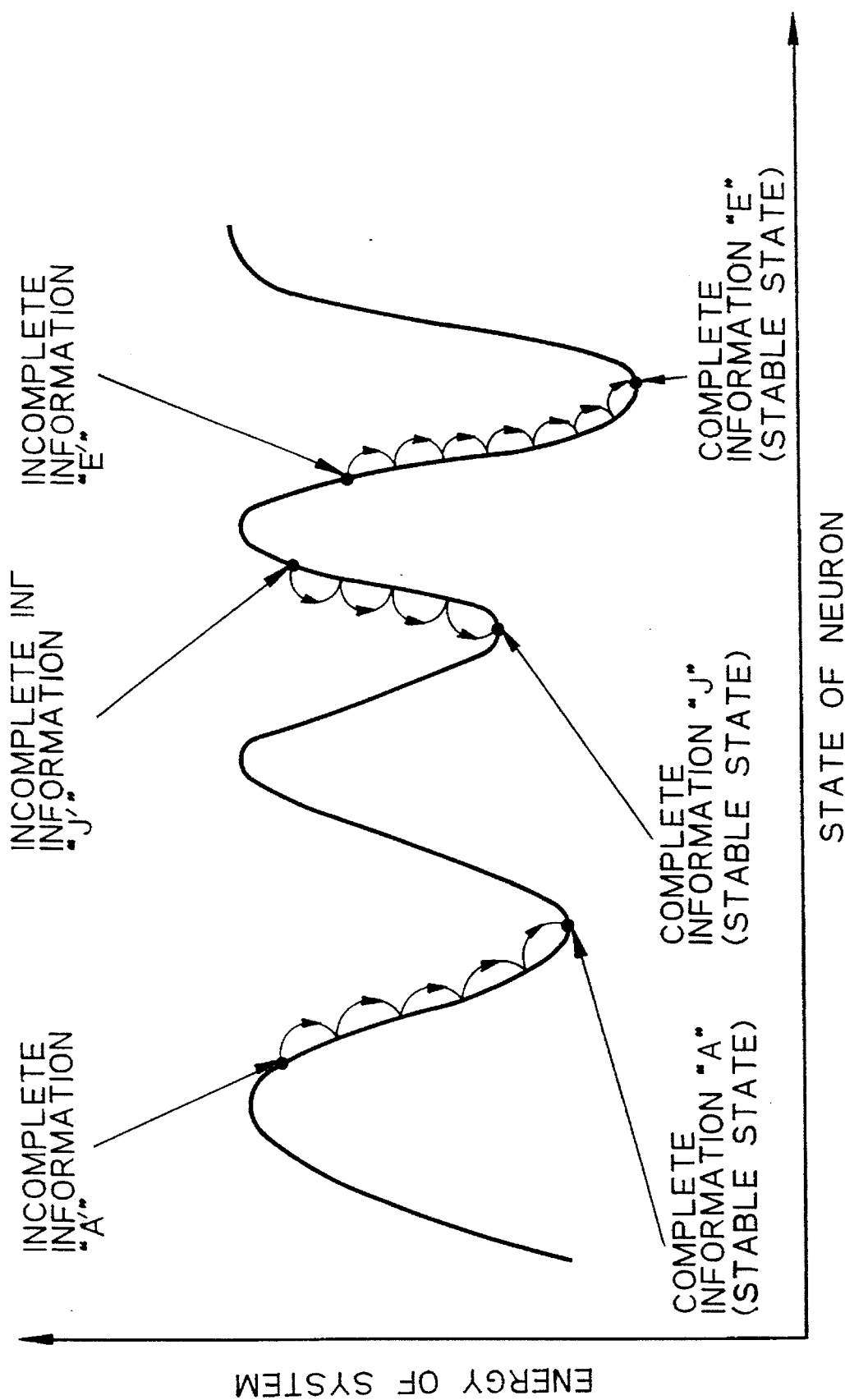
FIG. 1 is a diagram explanatory of the operation of a neural network.
Figure 2:
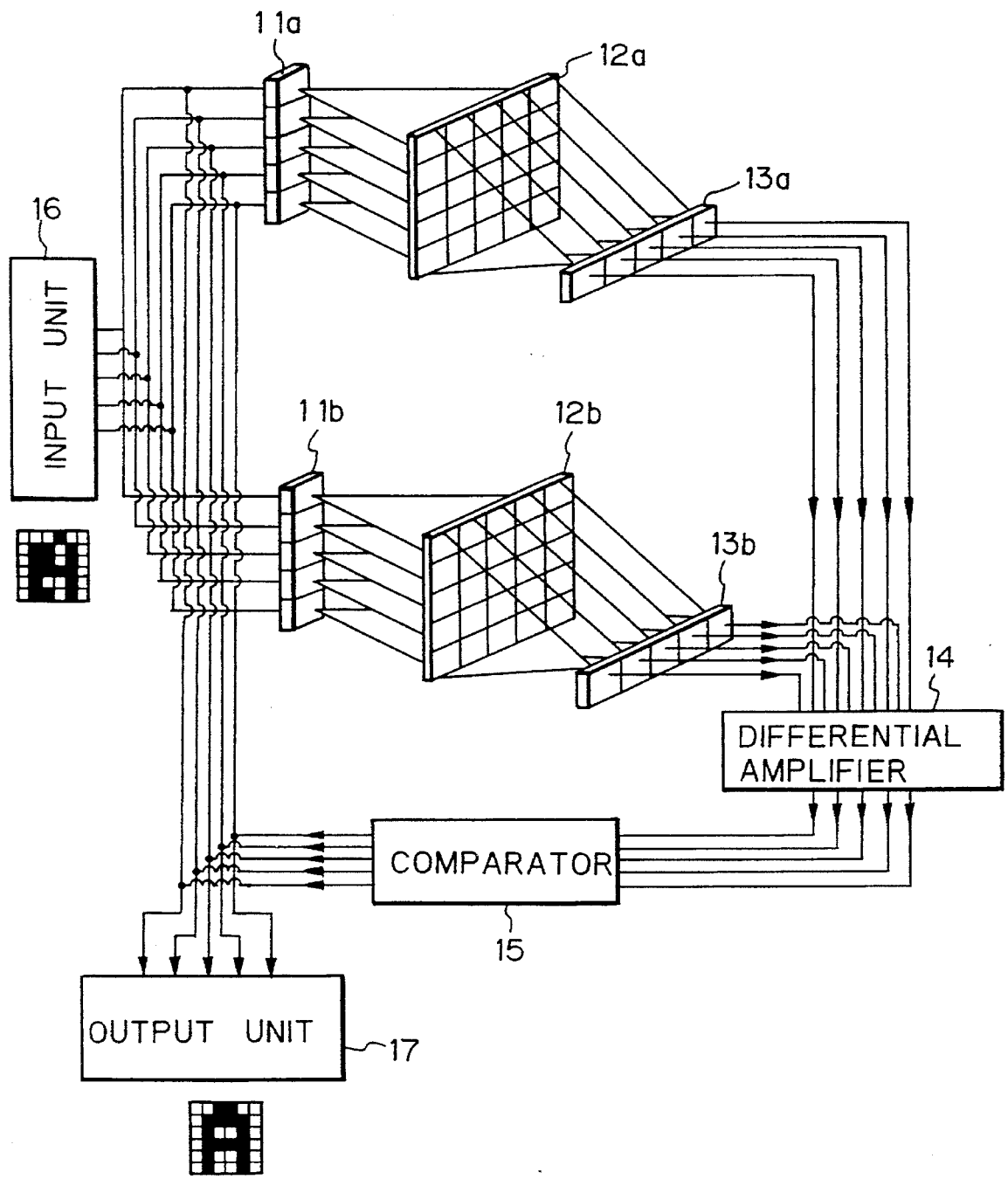
FIG. 2 is a view showing the structure of the conventional associative memory.
Figure 3:
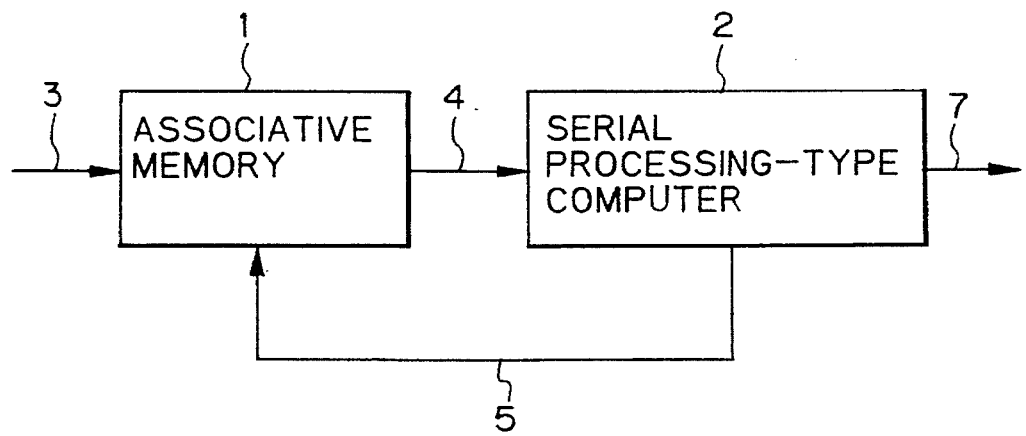
FIG. 3 is a diagram showing the concept of the configuration of an intelligence information processing system according to the present invention.
Figure 4:
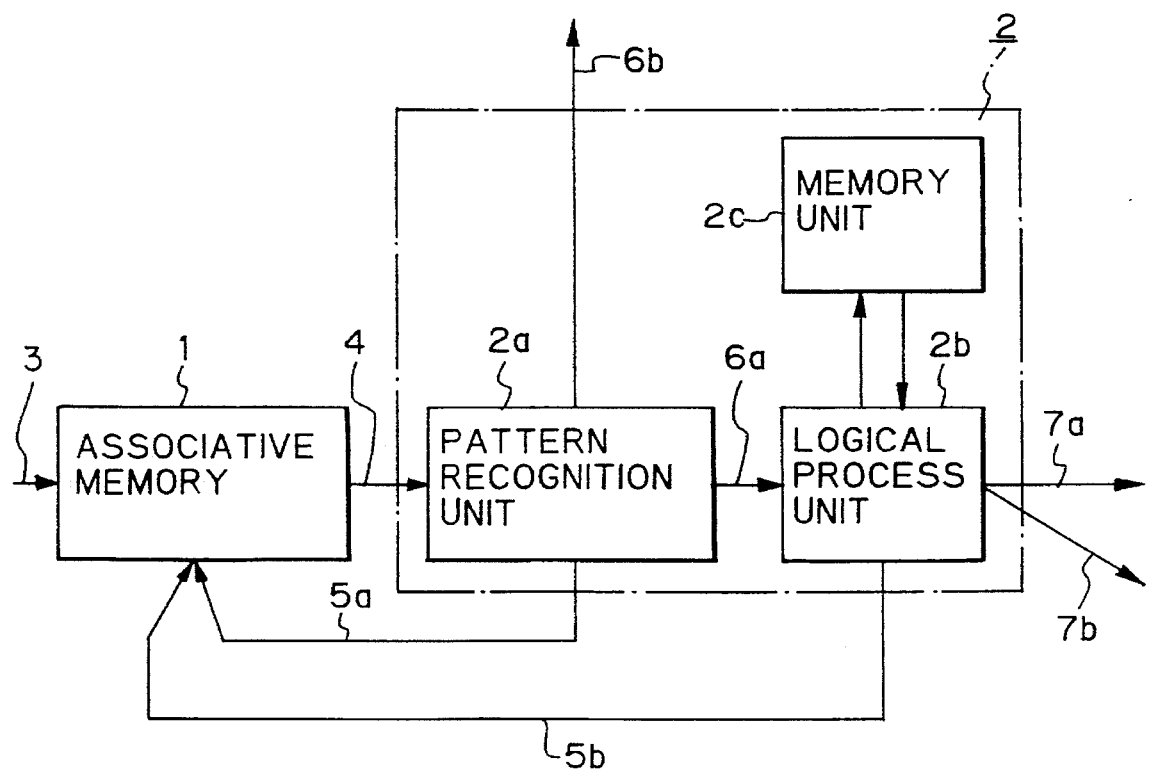
FIG. 4 is a diagram showing the detailed configuration of the intelligence information processing system according to the present invention.

FIG. 3 is a diagram showing the concept of the configuration of an intelligence information processing system according to this invention, and FIG. 4 is a diagram showing the configuration of the intelligence information processing system.

In these drawings, numeral 1 denotes an associative memory based on a neural network; 2 a serial computer; 2a a pattern recognition unit disposed in the serial computer 2; 2b a logical process unit in the serial computer 2; 2c a memory unit in the serial computer 2; and 3 an input pattern sent to the associative memory 1. Arrows interconnected between the associative memory 1, the pattern recognition unit 2a, the logical process unit 2b, and the memory unit 2c all indicate the flow of information. Numeral 4 denotes an associated output from the associative memory 1, and 5 a feedback input to the associative memory 1 from the serial computer 2, the feedback input comprising a re-association command and information for correcting an energy function. Numeral 5a denotes a feedback input to the associative memory 1 from the pattern recognition unit 2a; 5b a feedback input to the associative memory 1 from the logical process unit 2b; 6a a processed output from the pattern recognition unit 2a; and 6b a "process-impossible" output from the pattern recognition unit 2a. Numeral 7 denotes a processed output from the serial computer 2; 7a a finally processed output from the serial computer 2; and 7b a "process-impossible" output from the serial computer 2.

The operation of the intelligence information processing system will be described below.

In FIG. 3, the input pattern 3 is associated with the associative memory 1, and then the serial computer 2 evaluates the associated output 4. Based on the results of the evaluation, associative and restrictive conditions are added to the energy function of a neural network, as required, constituting the associative memory 1, and are then, together with the re-association command, fed to the associative memory 1 in the form of the feedback input 5. The association and evaluation are repeated until the associated output 4 converges. The converged associated output 4 thus obtained is identified with and evaluated by the intelligence of the serial computer 2. Based on the results of the identification and evaluation, the associative and restrictive conditions are again added to the energy function of the neural network, as required, and are then, together with the re-association command, returned to the associative memory 1 in the form of feedback. The input pattern 3 is repeatedly associated with the associated memory 1, and is evaluated by and identified with the intelligence of the serial computer 2 until it matches with the intelligence of the serial computer 2. Information matching with the intelligence of the serial computer 2 is given as the processed output 7 from the intelligence information processing system.

The intelligence information processing system will now be explained in detail with reference to FIG. 4 and as it is applied to a character recognition case.

In this embodiment, the character recognition case will be described in reference to the Hopfield model mentioned above, one of the neural network models.

For the following explanation, it is assumed that a character pattern is a handwritten or noise-obscured character string in this embodiment, and that the alphabet and various symbols are stored in the associative memory 1. It is also assumed that alphabetical letters from "A" to "Z" and symbols are also stored in the pattern recognition unit 2a, information regarding character strings being stored in the memory unit 2c, and that the information on the character strings contains a character string "CAT" therein, but does not contain a character string "CAE".

First, the input pattern 3 composed of three letters "CAT" is input to the associative memory 1. As a result of this input operation, it is assumed that the associated output 5 composed of "CA'E" is obtained by the associative memory 1. The associated output 5 is then input to the serial computer 2 so that the pattern recognition unit 2a therein evaluates whether "CA'E" are correct letter. Because the letters "C" and "E" of "CA'E" match with the character pattern of the pattern recognition unit 2a, these two letters are not required to be further associated with the associative memory 1. Because "A'", on the contrary, does not match with the character pattern of the pattern recognition unit 2a, the energy function of the neural network, constituting the associative memory 1, is improved, whereby "A'" is again associated with the associative memory 1. Such an operation is repeated until "A'" matches with the character pattern of the pattern recognition unit 2a, and thus it is eventually assumed that "A'" is recognized correctly as "A". When "A'" fails to match with the character pattern of the pattern recognition unit 2a after it has been associated with the associative memory 1 a predetermined number of times, the "process-impossible" output 6b is output from the unit 2a.

Next, as regards the output from the pattern recognition unit 2a, i.e., the character string "CAE", the logical process unit 2b is used to determine whether a word "CAE" is stored in the memory unit 2c. In this case, since the word "CAE" is not stored in the memory unit 2c, the energy function of the associative memory 1 is again improved, and thus the input character pattern is associated again with the associative memory 1. As a result of this operation, since a character pattern "CAT" is stored in the memory unit 2c, the associated character pattern "CAT" is regarded as a correct pattern which is then output from the logical process unit 26 as a system output 7a. Finally, after the above processes have been performed, if the associated output 4 does not match with the intelligence stored in the memory unit 2c, the "process-impossible" output 7b is output from the logical process unit 2b.

As has been described above, it is possible to correctly recognize complex character strings obscured by the noise or to recognize words by repeating the operation in which the character pattern is associated; the associated output is evaluated; the character pattern is again associated; the character string is collated and evaluated; and the character pattern is again associated.

The description so far given will be explained further in a quantitative manner.

The energy function E in the Hopfield model is expressed by the following equation:

$$E = -\frac{1}{2} \sum_{i=1}^{n} \sum_{j=1}^{n} T_{ij} V_i V_j - \sum_{i=1}^{n} I_i V_i$$

where $T_{ij}$ is the weight of the connection between the ith neuron and the jth neuron;

$V_i$ is the state of the ith neuron; and $I_i$ is an input from the outside or a threshold level with respect to the ith neuron.

An added restrictive condition is introduced to the above equation.

$$E = -\frac{1}{2} \sum_{i=1}^{n} \sum_{j=1}^{n} T_{ij} V_i V_j - \sum_{i=1}^{n} I_i V_i + \sum_{i=1}^{n} \Delta_i V_i$$

where $\Delta_i$ is a factor that can be modified outside. If the kth neuron is taken as an example, and its state changes as follows:

$$V_k \to V'_k$$

then the energy change $\Delta E_k$ is expressed as follows:

$$\begin{aligned} \Delta E_k &= E'_k - E_k \\ &= -\frac{1}{2} \sum_{i=1}^{n} T_{ik} V_i (V'_k - V_k) - I_k (V'_k - V_k) + \\ &\quad \Delta_k (V'_k - V_k) - \frac{1}{2} T_{kj} V_j (V'_k - V_k) \\ &= -\left( \sum_{i=1}^{n} {}_{(i \neq k)} T_{ik} V_i + I_k \right) \Delta V_k + \Delta_k \Delta V_k \end{aligned}$$

where $T_{ji} = 0$ $T_{in} V_i V_j = T_{ji} V_j V_i$ $\Delta V_k = V'_k - V_k$ 1) with respect to a pattern $V^{(a)}$ which cannot be recognized, $\Delta_k$ may assume the following value;

$$\Delta_k c \cdot v^{(a)}$$

where c is a constant.

2) with respect to a pattern $V^{(p)}$ which is not stored in the memory unit 2c, $\Delta_k$ may assume the following value:

$$\Delta_k = \sum_{m=1}^{M} {}_{(i \neq p)} c^{(m)} \{V_k^{(p)} - V_k^{(m)}\}$$

where $c^{(m)} = (V^{(p)} V^{(m)})^2 / 100$;

$V^{(m)} (m=1, 2, \ldots M)$ is a pattern stored in the memory unit 2c; and

M is the number of patterns in the memory unit 2c.

The above restrictive condition enhances the energy of incorrect patterns, and corresponds to making it difficult for the pattern to be associated. A method of providing a restrictive condition is not limited to the above method. Other methods, for example, one by which correct patterns are likely to be generated, or one which combines incorrect patterns with correct patterns, may also be employed.

The embodiment mentioned previously discloses an intelligence information processing system using the neural network of the Hopfield model as an associative memory. However, a multi-layer-structured neural network based on a back propagation leaning law or the like, and neural models, such as a Boltzmann machine, may also be employed by defining an appropriate energy function.

It is also possible to employ a neural network as an associative memory that is realized by a optical neural network or an Si-LSI. It is a matter of course that an associative memory based on a simulation using a serial computer may also be employed.

In the above embodiment, though character recognition has been described as an object of the intelligence information processing system, needless to say the present invention may also be applied to speech recognition, pattern recognition of images and the like.

What is claimed is:

1. A method for processing an input sequence of elements for comparison with a predetermined set of sequences of a predetermined set of elements, comprising the steps of:

(a) applying the input sequence of elements to an input of an associative memory comprising a neural network;

(b) obtaining an associated output sequence of elements from the associative memory;

(c) evaluating each element of the associated output sequence of elements to determine whether each element is a member of the predetermined set of elements;

(d) improving the energy function of the neural network in response to a determination that an element is not in the predetermined set of elements;

(e) repeating the steps of applying and evaluating in response to a determination that an element is not in the predetermined set, applying the element as the input to the associative memory;

(f) evaluating the associated output sequence of elements to determine whether the associated output sequence is a member of the predetermined set of sequences;

(g) improving the energy function of the neural network in response to a determination that the associated sequence is not in the predetermined set of sequences; and (h) repeating the step of applying and the steps of and evaluating in response to a determination that the associated sequence is not in the predetermined set of sequences, applying the input sequence of elements to the associated memory.

2. The method of claim 1 wherein the steps of improving comprise the steps of adding associative and restrictive conditions to an energy function of the neural network.

3. The method of claim 1 wherein the first step of repeating is more particularly the step of repeating for a predetermined number of times, and wherein the method further comprises the step of providing an output indicating that the sequence cannot be processed in response to the step of repeating being performed the predetermined number of times.

4. The method of claim 1 wherein the second step of repeating is more particularly the step of repeating for a predetermined number of times, and wherein the method further comprises the step of providing an input indicating that the sequence cannot be processed in response to the step of repeating being performed the predetermined number of times.

5. The method of claim 1 wherein the step of applying is more particularly the step of providing the input sequence of elements to an optical neural network.

6. The method of claim 1 further comprising the step of providing the predetermined set of sequences and the predetermined set of elements in a memory in a serial-type processing computer.

7. The method of claim 1, wherein the input sequence of elements is input sequence of character elements.

8. The method of claim 1, wherein the input sequence of elements is speech signal.

9. The method of claim 1, wherein the input sequence of elements is an image pattern.

10. The method of claim 1, wherein the step (c) of evaluating is performed by a serial computer.

11. The method of claim 1, wherein the step (f) of evaluating is performed by a serial computer.

12. The method of claim 1, wherein the step (d) of improving is performed by a serial computer which manipulates the associative memory.

13. The method of claim 1, wherein the step (g) of improving is performed by a serial computer which manipulates the associative memory.

14. The method of claim 1, wherein the step (e) of repeating is performed by a serial computer and includes the step of using the serial computer to send a reassociate signal to the associative memory.

15. The method of claim 1, wherein the step (h) of repeating is performed by a serial computer and includes the step of using the serial computer to send a reassociate signal to the associative memory.

16. A method for processing an input signal representative of a sequence of physical elements for comparison with a predetermined set of sequences of a predetermined set of elements, comprising the steps of:

(a) applying the input signal to an input of an associative memory device comprising a neural network having an energy function;

(b) obtaining an associated output signal representative of an associated output sequence of elements from the associative memory device;

(c) evaluating each element of the associated output sequence of elements to determine whether each element is a member of the predetermined set of elements;

(d) improving the energy function of the neural network in response to a determination that an element is not in the predetermined set of elements;

(e) repeating the steps of applying and evaluating in response to a determination that an element is not in the predetermined set, applying an input signal representative of the element which is not in the predetermined set to the associative memory device;

(f) evaluating the associated output sequence of elements to determine whether the associated output sequence is a member of the predetermined set of sequences;

(g) improving the energy function of the neural network in response to a determination that the associated sequence is not in the predetermined set of sequences; and (h) repeating the step of applying the steps of and evaluating in response to a determination that the associated sequence is not in the predetermined set of sequences, applying an input signal representative of the input sequence of elements to the associated memory device.

17. The method of claim 16 wherein the steps (d) and (g) of improving comprise the steps of adding associative and restrictive conditions to the energy function of the neural network.

18. The method of claim 16 wherein the first step (e) of repeating is more particularly the step of repeating for a predetermined number of times, and wherein the method further comprises the step of applying an output indicating that the sequence cannot be processed in response to the step of repeating being performed the predetermined number of times.

19. The method of claim 16 wherein the second step (h) of repeating is more particularly the step of repeating for a predetermined number of times, and wherein the method further comprises the step of applying an output indicating that the sequence cannot be processed in response to the step of repeating being performed the predetermined number of times.

20. The method of claim 16 wherein the step of applying is more particularly the step of applying the input sequence of elements to an optical neural network.

21. The method of claim 16 further comprising the step of providing the predetermined set of sequences and the predetermined set of elements in a memory in a serial-type processing computer.

22. The method of claim 16, wherein the input sequence of elements is input sequence of character of elements.

23. The method of claim 16, wherein the input sequence of elements is speech signal.

24. The method of claim 16, wherein the input sequence of elements is an image pattern.

25. The method of claim 16, wherein the step (c) of evaluating elements is performed by a serial computer.

26. The method of claim 16, wherein the step (f) of evaluating is performed by a serial computer.

27. The method of claim 16, wherein the step (d) of improving is performed by the serial computer which manipulates parameters of the associative memory.

28. The method of claim 16, wherein the step (g) of improving is performed by the serial computer which manipulates parameters of the associative memory.

29. The method of claim 16, wherein the step (e) of repeating is performed by a serial computer and includes the step of using the serial computer to send a reassociate signal to the associative memory.

30. The method of claim 16, wherein the step (h) of repeating is performed by a serial computer and includes the step of using the serial computer to send a reassociate signal to the associative memory.

* * * * *